March 7, 1939. C. J. KINZIE ET AL 2,149,939
CRYSTALLINE GRANULAR TITANIUM CARBIDE AND METHODS OF MAKING SAME
Filed May 8, 1936 2 Sheets-Sheet 1

INVENTORS:
CHARLES J. KINZIE
DONALD S. HAKE
BY
ATTORNEY.

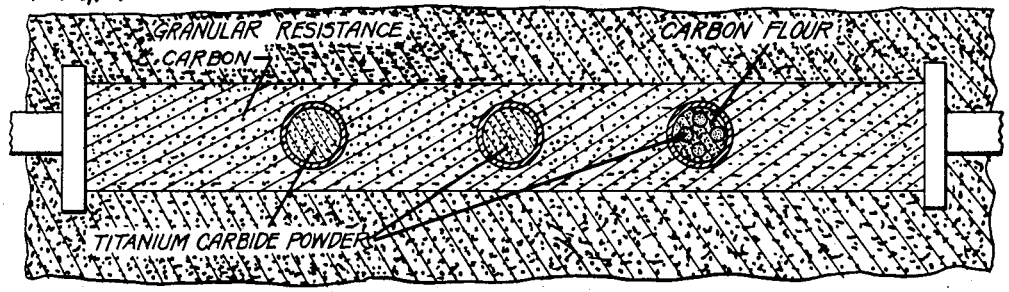
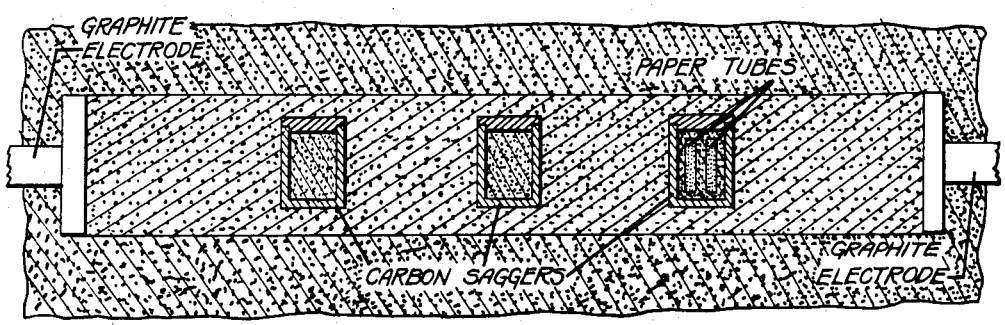
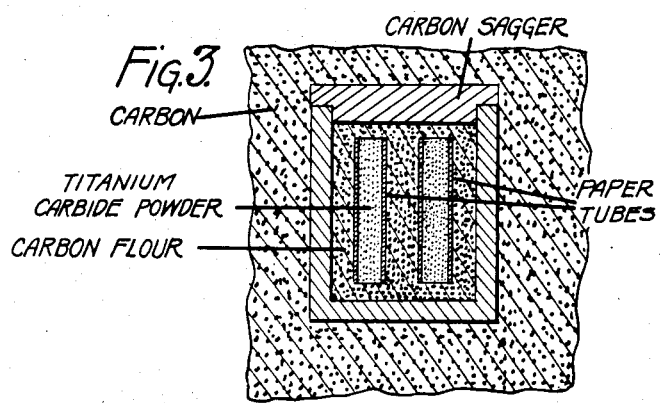
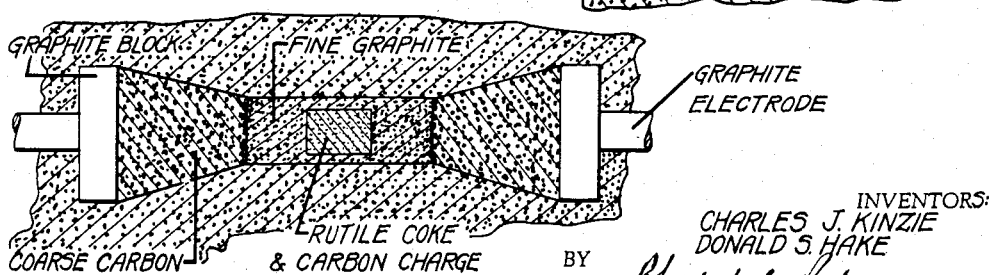

Patented Mar. 7, 1939

2,149,939

UNITED STATES PATENT OFFICE 2,149,939

CRYSTALLINE GRANULAR TITANIUM CARBIDE AND METHODS OF MAKING SAME

Charles J. Kinzie and Donald S. Hake, Niagara Falls, N. Y., assignors to The Titanium Alloy Manufacturing Company, New York, N. Y., a corporation of Maine Application May 8, 1936, Serial No. 78,558

4 Claims. (Cl. 23—208)

Our invention relates generally to the production of novel compounds of titanium in the electric resistance furnace, and more particularly to a crystalline titanium carbide in a substantially pure state as will be hereinafter described.

The titanium carbide of commerce, such as that produced by reacting rutile and carbon in the electric arc furnace, possesses several outstanding defects inherent from the process by which it is made.

In the first place it is a variable material, always containing some graphitic carbon derived from the portions at bottom of cooled mass, while the upper parts usually show combinations of titanium, carbon and nitrogen.

Titanium carbide as produced in this manner consists of a fused mass showing a variable crystal structure. The mass is hard and coherent, and can only be crushed with difficulty. Upon screening, various sizes may be obtained, but all these consist of fractured and incomplete crystal aggregates or parts of crystals; for abrasives, it has been impossible to so manipulate the process of arc furnace reaction to produce in successive charges the same product. Sometimes the mass is composed of large crystals of irregular form, while at other times the mass consists of minute crystals. The free carbon as graphite may vary from one percent to several percent.

These variations are due partly to the fact that the carbon electrodes, being in direct contact with the charge, yield to the reaction mass a varying amount of carbon, due to various causes, one of which may be the variation in the electrode properties, composition, conductance, density, etc. Furthermore the result may vary due to uncontrollable factors in the operation itself. The fact remains, however, that although titanium carbide has shown considerable promise as an abrasive material, the ever-occurring variables have precluded its use with consistent results, and so the development of titanium carbide for abrasive purposes has been brought to a standstill.

Quite aside from the foregoing difficulties, the fused massive arc furnace titanium carbide has not proven desirable as a material for making TiCl₄, because the lumps react only at the surface when heated in contact with chlorine, and also because the carbon residue forms a skeletonized envelope around the mass as the titanium is removed by the chlorine; hence the reaction slows down as the carbon skeleton becomes thicker.

We have now discovered new and improved methods whereby titanium carbide may be produced composed of individual crystals in the form of loosely held aggregates, which are easily reduced to individual crystals for use as abrasives, while the loosely aggregated crystal mass may be used as an efficient means for producing TiCl₄, since the chlorine can penetrate and react throughout the mass, in contrast with the surface penetration only as in the case of the old fused TiC masses.

By our discovery we have made available crystals of TiC in pure state which are controllable both in form and size.

In addition as one modification of our improved methods TiC may be made from ilmenite, which has not been possible by the use of the arc type furnace.

In the accompanying drawings showing a type of an electric resistance furnace in which our invention may be practiced—

Fig. 3 is an enlarged section taken on the line 3—3 of Fig. 2; and

Figs. 4–6 are enlarged sectional views showing different methods of loading the furnace.

Figure 1:
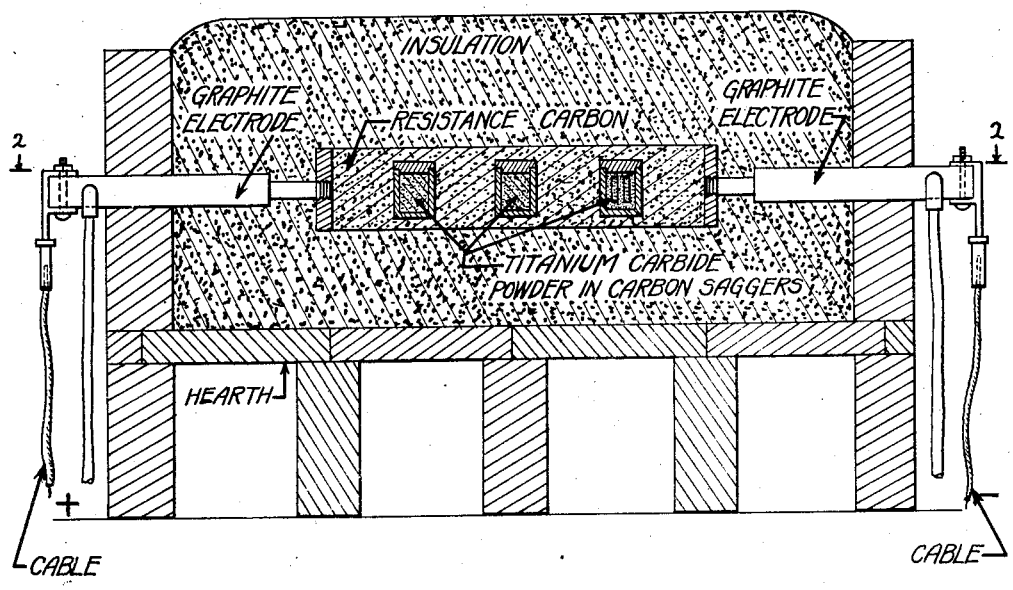
Fig. 1 is a sectional elevation of the furnace and its contents.
Figure 2:
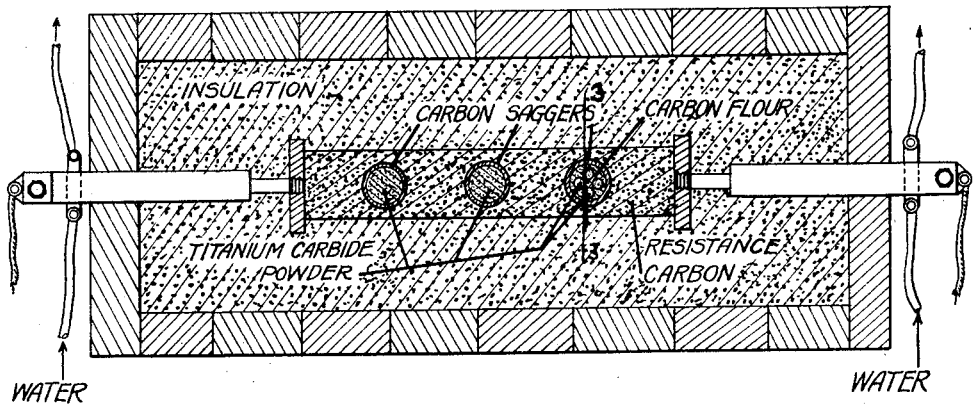
Fig. 2 is a section taken on the line 2—2 of Fig. 1.

Referring to these Figs. 1 and 2, the hearth of any suitable material is supported on piers, the hearth forming a supporting base for the furnace and its charge. Such base has also side and end walls to hold the charge. Through each of the end walls is suitable opening for arranging the graphite electrodes, while the side walls of the furnace are built up of loose bricks to permit the free escape of evolved gases with cracks or openings also formed in the bottom which is raised for ample air circulation.

The following examples will show how our methods are practiced in this furnace by which our novel and improved crystalline titanium carbide may be produced.

The following examples illustrate our improved methods for making our novel crystalline titanium carbide.

EXAMPLE A

*Production of titanium carbide from ilmenite*

A mixture consisting of

| | Parts by weight |
|---|---|
| 60 mesh ilmenite | 100 |
| 35 mesh petroleum coke | 100 | was put in graphite saggers, and heated to approximately 2000° C. in the electrical resistance furnace shown in the accompanying drawings.

Analysis of the ilmenite and petroleum coke used by us was approximately as follows:

| Ilmenite | Per cent | Petroleum coke | Per cent |
|---|---|---|---|
| $TiO_2$ | 53.32 | Volatile matter | 8.81 |
| FeO | 27.30 | Fixed carbon | 89.86 |
| $Fe_2O_3$ | 14.41 | Ash | 1.33 |
| $SiO_2$ | 1.60 | | |
| $Al_2O_3$ | 1.39 | | 100.00 |
| $MnO_2$ | 0.36 | | |
| $P_2O_5$ | 0.21 | | |
| Others | 1.41 | | |
| | 100.00 | | |

A layer of insulation consisting of

| | Parts |
|---|---|
| Silica sand | 334 |
| Petroleum coke (10 mesh) | 225 |
| Sawdust (all parts by weight) | 50 | was put on the hearth of the furnace and leveled off even with the bottoms of the terminal electrodes. Two strips of sheet metal, spaced 4 inches apart, were then put between the terminal electrodes to support the resistance carbon until the insulation was placed in position. After putting down a one inch layer of resistance carbon on the bed, saggers were then set in place and surrounded by resistance carbon, which filled the rectangular space between sheet metal strips and terminal electrodes. The sheet metal strips were then withdrawn, and the core of the furnace surrounded on all sides with a 12 inch layer of insulation.

Other forms of carbon may be used in place of petroleum coke, such as coal or calcined coal in the form of foundry coke, if desired.

Power was supplied by a 20 kva. transformer and was turned on with a load of approximately 20 kilowatts and so maintained for three hours. The power input was approximately 48 kilowatt hours.

Outside the furnace the ends of the graphite electrodes may be cooled by passing a current of water through them as shown in Figs. 1 and 2.

The furnace was allowed to cool 16 hours before removing the insulation from around the core.

We found that a layer of silicon carbide, one half inch thick, was formed around the resistance carbon, thereby showing that a temperature of between 2000 and 2200 C. was reached in the core of the furnace.

The saggers contained a granular material consisting of graphitic carbon and also hard, dense lumps, or aggregates having a metallic luster, which appeared like small beads of metal throughout the mixture. The hard, dense material had magnetic properties, and could be separated from the coarse graphitic carbon by means of a magnet.

140.1 grams of the product were obtained from a 218.7 gram charge of this ilmenite-coke mixture.

The product was separated into two fractions by means of a magnet, and comprised the following:

Magnetic fraction weighed 94.6 grams (67.52%)
Non-magnetic fraction weighed
                      45.5 grams (32.48%)

The magnetic material (a hard, dense substance) was found to be crystalline titanium carbide dispersed in a matrix of high carbon iron. We also found that the titanium carbide could be separated from the iron by leaching with dilute sulphuric acid, the iron going into solution as iron sulphate with the titanium carbide remaining unattacked.

For example, 92.7 grams of the magnetic material which had been pulverized to pass a 40 mesh sieve, were put in a beaker with 1 liter of 5% sulphuric acid and then heated on the water bath for 12 hours. The acid reacted vigorously for the first hour or two. The insoluble material was filtered on a Buchmor funnel and washed free of acid and iron sulphate. The resulting filter cake was dried and analyzed substantially as follows:

| | Grams |
|---|---|
| Weight of solids insoluble in acid | 61.2 |
| Per cent of solids insoluble in acid | 66.0 |

| | Per cent |
|---|---|
| Silicon | 4.51 |
| Titanium | 54.27 |
| Iron | 1.56 |
| Carbon | 31.36 |
| Others | 8.30 |
| | 100.00 |

All but a small percentage of the iron had thereby been removed by this weak acid treatment.

Microscopic examination showed that a large percentage of the carbon was present in the form of free graphitic carbon. A separation of the graphitic carbon and titanium carbide was made by means of a solution of barium iodide of a specific gravity of 2.25 in the following manner:

10 grams of this 60 mesh material were put in glass cylinder with 50 cc. of barium iodide solution. After thoroughly mixing, titanium carbide and graphite were allowed to separate. Titanium carbide settled to the bottom leaving the graphitic carbon in suspension in the barium iodide solution. Carbon was decanted off and the titanium carbide was then washed and dried with the following results:

69 parts of the sample settled out, while 31 parts of the sample were floated out.

The analysis of the titanium carbide separated as above was substantially as follows:

| | Per cent |
|---|---|
| Titanium | 71.16 |
| Silicon | 2.77 |
| Iron | 1.51 |
| Carbon | 18.00 |
| Balance | 6.56 |
| | 100.00 |

This analysis shows that a concentrate containing approximately 89% titanium carbide has been produced by separating the iron and graphitic carbon from the magnetic fraction.

Such separation of graphitic carbon by means of barium iodide probably would not be economical for large scale productions. It would probably be necessary to use either a wet or dry concentrating table, or some other method of flotation.

Considerably more carbon was mixed with the ilmenite than is required for complete reduction of the oxides. The large excess of carbon was added to prevent the formation of a hard, massive iron-titanium carbide regulus, which would be difficult to pulverize. Excess carbon causes the titanium carbide and iron to form small lumps or aggregates that can be easily separated from the excess carbon and pulverized. Less carbon may be used, but we prefer to add a large excess.

The chief advantage of our improved methods is that titanium carbide may be readily produced from ilmenite, one of the cheapest titanium bearing ores available.

We prefer to use graphite saggers as containers for the mixture of carbon and ilmenite, but other methods of loading may be used. For example, the mixture could be put in paper containers and surrounded by resistance carbon, or an envelope of the mixture could be put around the carbon core.

The product is a suitable raw material for use in the manufacture of TiCl₄, for which purpose either the residue after the acid leach that still contains the excess carbon could be briquetted, or if desired the titanium carbide obtained by the separation of the TiC from free carbon could be briquetted and used. In either case TiCl₄ results upon heating the TiC in a stream of chlorine in any suitable chlorinating apparatus.

Titanous sulphate can be made from the TiC by first grinding to about 325 mesh, mixing with 66° Bé. H₂SO₄, and then heating to react to a water-soluble titanium sulphate, from which solution the insoluble matter is separated. Oxidation of the titanous sulphate would of course yield a titanic sulphate solution.

The TiC as produced in this Example A will prove suitable for some abrasive and cutting applications, but for most purposes we prefer to form the larger crystals such as described in the following Examples A–1 and A–2. Either may be accomplished as a part of Example A by reheating in the resistance furnace.

EXAMPLE A–1

*Recrystallization of titanium carbide in the resistance furnace*

The titanium carbide, similar to the product made by reducing ilmenite in the resistance furnace according to the procedure of Example A, was replaced in the resistance furnace and then recrystallized in the following manner.

Titanium carbide as used was of approximately the following composition—

|    | Per cent |
|----|----------|
| Ti | 71.16 |
| Si | 2.77 |
| SiC | .22 |
| Fe | 1.51 |
| C | 18.0 |
|   | 93.66 |

This 80 mesh titanium carbide was mixed with 1% titanium dioxide and packed in carbon saggers 2″ in diameter by 2½″ high, and then heated in the resistance furnace to a temperature high enough to form more or less loosely bonded crystals of titanium carbide. In one case, the titanium carbide powder was packed in ⅜″ paper tubes and the tubes were then put in a carbon sagger and surrounded with carbon flour.

One method of loading the furnace is shown in Figs. 4 and 5.

As shown in these figures, the carbon saggers containing the titanium carbide powder were put in the core of the resistance furnace and surrounded with granular resistance carbon. Such saggers were spaced four inches apart, and six inch spaces were left between the end saggers and terminal electrodes, which spaces were filled in with resistance carbon. A 12 inch bed of insulation consisting of

|  | Parts |
|---|---|
| Petroleum coke | 225 |
| Silica sand | 334 |
| Sawdust (all parts by weight) | 50 | was put on the hearth of the furnace before building up the core between the terminal electrodes. Strips of sheet metal were used to hold the resistance carbon in place until the insulation was put on the sides, after which they were withdrawn.

After covering the core with insulation to a depth of 15 inches, power was turned on from a 20 kva. transformer, and an average load of about 13.0 kilowatts was maintained for four hours. The power input was approximately 52 kilowatt hours.

The furnace was allowed to cool 24 hours before removing the insulation from around the core.

When the furnace was opened, we found that the insulation next to the core had been converted to silicon carbide, the core being enclosed in an envelope of silicon carbide about ½ inch thick.

The graphite saggers were found to contain rods of more or less loosely bonded crystals of titanium carbide, which were steel gray in color with a metallic sheen. These crystals were cubical. Such rods of titanium carbide crystals were found to be good conductors of electricity.

Rods produced in this manner should be suitable for arc light electrodes; also as a raw material for the production of TiCl₄, titanium sulphate as well as an abrasive material.

When the rods were used as arc light electrodes a long, steady arc was obtained which gave an intense white light, similar to the light from the so-called "White flamers" the cored carbon electrodes used for moving picture projectors. Unlike these carbon electrodes, there was no tendency for the electrodes to burn away or disintegrate rapidly beyond the tip. For this reason electrodes of titanium carbide should have an exceedingly long life compared with carbon electrodes. These rods should also be found suitable as resistance rods for electric heaters and other electrical appliances.

Although we prefer to use carbon saggers in the production of recrystallized titanium carbide, other methods of loading may be used. For example, the titanium carbide powder may be pressed into rods, or packed in paper tubes, and put in the core in rows with resistance carbon between.

EXAMPLE A–2

*Conversion of titanium carbide powder, similar to the carbide produced from ilmenite as under Example A, to a fused lump*

80 mesh titanium carbide powder, similar to the product of Example A was mixed with 1% titanium dioxide and heated in the resistance furnace to a temperature high enough to fuse the carbide to a hard dense lump. (Titanium dioxide was added to eliminate excess carbon and as a mineralizing agent.)

The titanium carbide and titanium dioxide were thoroughly mixed and packed in graphite saggers; the saggers were then put in the core of the resistance furnace and surrounded with granular resistance carbon as in Example A–1.

Our method of loading is substantially the same as in Example A–1 and as shown in Figs. 4 and 5.

After surrounding the core with insulation consisting of sand, coke and sawdust, power was turned on from a 20 kva. transformer and an average load of 17.5 kilowatts was maintained for 4 hours. The power input was 70 kilowatt hours. The furnace was allowed to cool 24 hours before removing the insulation from around the core.

When the furnace was opened, the core was found enveloped by a 1 inch layer of silicon carbide.

The saggers contained hard, dense lumps of fused titanium carbide. The volume of the fused lump was less than half that of the titanium carbide powder.

When the lump was fractured, the fractured surface had a bright metallic luster, was steel gray in color and showed crystal faces, quite large in some areas.

The fused material was quite hard and dense and scratched glass and hardened steel; it was found to be a good conductor of electricity. 98.88% of the fused material could be dissolved in mixed acids, $H_2SO_4$, $HCl$ and $HNO_3$.

This material, because of its hardness, will be found suitable for use as an abrasive and also for cutting. In the form of fused rods, it will be found superior to carbon as arc light electrodes because of the longer life, brilliant blue white light emitted, and also the stabilizing effect of titanium on the arc. It also gives a very quiet arc which is unusual where plain carbon electrodes are concerned.

The $TiO_2$ addition may be varied to accord with the amount of free carbon present. Rods and other shapes of titanium carbide may be formed by fusing the carbide in suitable graphite molds. Shapes thus produced may be used for cutting, arc welding, arc light electrodes, grinding, etc.

EXAMPLE B

*Production of crystalline titanium carbide from pure titanium oxide*

A mixture consisting of

| | Parts |
|---|---|
| 60 mesh sintered $TiO_2$ (pure) | 100 |
| Petroleum coke | 34 | was put in graphite saggers and heated to approximately 2100° C. in the electrical resistance furnace.

Analysis of titanium oxide and petroleum coke follow:

| Sintered titanium dioxide (pure) | | Petroleum coke | |
|---|---|---|---|
| | Percent | | Percent |
| $TiO_2$ | 99.58 | Volatile matter | 8.81 |
| $SiO_2$ | 0.34 | Fixed carbon | 89.86 |
| | | Ash | 1.33 |

Our method of placing the charge in the furnace is shown in Figs. 4 and 5 with loading procedure the same as under Example A-1. The insulation used around core consisted of

| | Parts |
|---|---|
| Silica sand | 334 |
| Petroleum coke | 225 |
| Sawdust (all parts by weight) | 50 |

Power was turned on from a 20 kva. transformer and a load of approximately 20 kilowatts was maintained for three hours. The power input was approximately 45 kilowatt hours.

Furnace was allowed to cool for 24 hours before removing insulation from around the core. A layer of silicon carbide, one-half inch thick, was formed around the core of this furnace, showing that a temperature of 2000 to 2200° C. was reached.

The graphite saggers contained cylindrical cores of titanium carbide. The outside of the core consisted entirely of cubical crystals of titanium carbide about ½ mm. in size while the interior mass consisted of finer crystals of titanium carbide. Hence it is shown that by varying the method of loading and furnace operating procedure, time of heating at the higher temperature, etc., the size of crystals may be controlled. In a larger furnace larger crystals should result. The TiC crystals as produced in this way are brilliant shiny crystals.

We found that the larger crystals develop adjacent to the sagger walls, and so by loading in relatively thin layers between carbon partitions, a much larger proportion of the TiC could be produced in the larger crystals.

Although substantially pure titanium dioxide was used in this experiment, other forms of titanium dioxide, such as rutile, brookite, etc. may be used.

While we prefer to use graphite saggers as containers for the mixture of carbon and titanium dioxide, other methods of loading can be used. A mixture can be put in paper containers and surrounded by resistance carbon, or an envelope of the mixture can be put around the carbon core of the furnace.

EXAMPLE C

*Production of fused titanium carbide from rutile and carbon*

A mixture consisting of

| | Parts |
|---|---|
| Rutile | 100 |
| Petroleum coke (35 mesh) | 45 | was first put in the core of the resistance furnace and heated to a temperature high enough to form a fused mass of titanium carbide.

Analysis of the rutile used was substantially as follows:

| | Per cent |
|---|---|
| $SiO_2$ | 2.06 |
| $TiO_2$ | 93.4 |
| $Fe_2O_3$ | 1.76 |
| $Al_2O_3$ | 0.7 |
| $P_2O_5$ | 0.6 |
| $CaO$ | 1.75 |
| | 100.27 |

The insulation used around the core consisted of

| | Parts |
|---|---|
| Silica sand | 334 |
| Petroleum coke | 225 |
| Sawdust (all parts by weight) | 50 |

This mixture was surrounded with granular resistance carbon as shown in Fig. 6.

After surrounding the core with insulation, power was turned on and a load of 10 kilowatts was maintained for 8 hours. Power input was 80 kilowatt hours. The furnace was allowed to cool 24 hours before removing the insulation from around the core.

This core contained a fused lump of titanium carbide, quite hard and dense. When the lump was fractured, the fractured surface showed crystal faces and had a metallic luster and was steel gray in color.

This product will be found suitable for use as an abrasive; also as a raw material for the production of $TiCl_4$ and titanium sulphate.

Analysis of this titanium carbide product was approximately as follows:

| | Per cent |
|---|---|
| Si | 0.72 |
| Ti | 78.75 |
| Fe | 0.20 |
| C | 19.82 |
| | 99.49 |

We claim as our invention:

1. The method of converting ilmenite mixed with coke into a friable essentially crystalline and chemically reactive titanium carbide, which comprises placing said mixture of ilmenite and coke in equal parts by weight to form the charge within a carbon container wholly surrounded by resistance carbon acting substantially as the heat-producing resistor, but substantially mechanically separated therefrom, and then heating said separated charge enveloped in an insulating mix in an electric resistance furnace by the temperatures mainly developed in the resistor surrounding the charge with substantial decomposition of the charge into said crystalline carbide, and then removing the metallic iron formed.

2. The method of converting ilmenite mixed with coke into a friable essentially crystalline and chemically reactive titanium carbide, which comprises placing said mixture of ilmenite and coke in equal parts by weight to form the charge within a carbon container wholly surrounded by resistance carbon acting substantially as the heat-producing resistor, but substantially mechanically separated therefrom, and then heating said separated charge enveloped in an insulating mix in an electric resistance furnace between 2000° and 2200° C. mainly developed in the resistor surrounding the charge with substantial decomposition of the charge into said crystalline carbide, and then removing the metallic iron formed.

3. The method of converting ilmenite mixed with coke into a friable essentially crystalline and chemically reactive titanium carbide, which comprises placing said mixture of ilmenite and coke in equal parts by weight to form the charge within a carbon container wholly surrounded by resistance carbon acting substantially as the heat-producing resistor, but substantially mechanically separated therefrom, and then heating said separated charge enveloped in a carbonaceous reducing agent in an electric resistance furnace by the temperatures mainly developed in the resistor surrounding the charge with substantial decomposition of the charge into said crystalline carbide, and then removing the metallic iron formed.

4. The method of converting ilmenite mixed with coke into a friable essentially crystalline and chemically reactive titanium carbide, which comprises placing said mixture of ilmenite and coke in equal parts by weight to form the charge within a carbon container wholly surrounded by resistance carbon acting substantially as the heat-producing resistor, but substantially mechanically separated therefrom, and then heating said separated charge enveloped in a carbonaceous reducing agent in an electric resistance furnace between 2000° and 2200° C. mainly developed in the resistor surrounding the charge with substantial decomposition of the charge into said crystalline carbide, and then removing the metallic iron formed.

CHARLES J. KINZIE.
DONALD S. HAKE.